United States Patent [19]

Kang et al.

[11] Patent Number: 4,511,628

[45] Date of Patent: Apr. 16, 1985

[54] RUBBER ARTICLES HAVING IMPROVED METAL ADHESION AND METAL ADHESION RETENTION EMPLOYING BIS(2-MERCAPTOBENZOTHIAZATO) NICKEL

[75] Inventors: Jung W. Kang, Clinton; James A. Davis, Uniontown, both of Ohio

[73] Assignee: The Firestone Tire & Rubber Company, Akron, Ohio

[21] Appl. No.: 575,260

[22] Filed: Jan. 30, 1984

[51] Int. Cl.³ .................. B32B 15/04; B32B 15/08; C08K 5/47; C08K 5/56

[52] U.S. Cl. .................. 428/457; 428/462; 428/492; 428/521; 524/83; 524/571; 524/575

[58] Field of Search ............. 524/83; 428/457, 462, 428/492, 521

[56] References Cited

U.S. PATENT DOCUMENTS

| | | | |
|---|---|---|---|
| 3,629,038 | 1/1969 | Satake et al. | 156/245 |
| 3,905,947 | 9/1975 | Cowell et al. | 260/79.5 R |
| 3,950,313 | 4/1976 | Bain et al. | 525/373 |
| 3,991,130 | 11/1976 | Cowell et al. | 525/151 |

FOREIGN PATENT DOCUMENTS 914787  1/1963  United Kingdom.

*Primary Examiner*—Herbert J. Lilling
*Attorney, Agent, or Firm*—Daniel N. Hall

[57] ABSTRACT

Rubber compositions and metal-reinforced rubber ply members have improved metal adhesion and metal adhesion retention. The improvement comprises admixing from about 0.5 to about 10.0 parts per hundred rubber (phr) of bis(2-mercaptobenzothiazato) nickel with a vulcanizable rubber composition prior to combining the metal and rubber and then curing. A method for improving the metal adhesion and metal adhesion retention between a vulcanizable rubber and metal member includes the step of dispersing from about 0.5 to about 10.0 phr of nickel in a vulcanizable rubber composition prior to curing.

4 Claims, No Drawings

RUBBER ARTICLES HAVING IMPROVED METAL ADHESION AND METAL ADHESION RETENTION EMPLOYING BIS(2-MERCAPTOBENZOTHIAZATO) NICKEL

TECHNICAL FIELD

The present invention is directed toward improving the adhesion and adhesion retention between a rubber composition, used in the manufacture of tires, conveyor belts, hoses and the like, and metallic reinforcement cord, such as steel wire and cable which commonly carries a protective coating of zinc or brass and is embedded in the stock. Flat sheet or strips of such stocks, reinforced with metal or fiber, are utilized as plies or other components of the article and are referred to in the art as rubber skim stocks. Skim refers to a relatively thin layer or coating of the rubber over the reinforcement filaments or cords. Greater thicknesses of rubber are also bonded to metal in other instances such as motor mounts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

In order for these components to function effectively, it is imperative that adhesion between the rubber and the steel cord be effectively maintained. Because steel is prone to oxidation, which even in minor degree is highly deleterious to the necessary adhesion with the rubber skim stock, often it is impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates the desirability of adding materials to rubber to improve article life and service through increased adhesion and adhesion retention. Improved adhesion between rubber and brass or zinc or, the rubber skim stock and brass- or zinc-plated steel is obtained according to the present invention.

BACKGROUND ART

In order to promote adhesion between rubber and ferrous metals it is known to employ a variety of metallic salts as coatings to the metal or as an ingredient in a rubber composition. It is also known to add various resins as tackifiers and/or adhesion promoters and, in other instances, to employ both a metal salt and a resin. Typical of the latter type of art is U.S. Pat. No. 3,628,038 which discloses a method for bonding EPDM rubbers to a metal wherein sulfur, vulcanization accelerators, and a halogenated alkylphenol-formaldehyde resin as a vulcanizing agent are added to the rubber which is then placed upon the metal and bonded thereto during vulcanization. Data presented in the patent established an increase in adhesion where all three components were employed as compared to control stocks containing only sulfur or the vulcanizing agent. Apart from the fact that rubber stocks normally carry an accelerator to shorten cure time and that the patent disclosed an accelerator, there is no teaching that the accelerator alone can improve rubber-to-metal adhesion, particularly in rubbers other than EPDM.

The use of metallic salts is exemplified by U.S. Pat. No. 3,905,947 which is directed toward a method for improving rubber-to-metal adhesion by adding an organo-nickel salt to the rubber and then vulcanizing it while in contact with the metal surface. The organo-nickel salts include a plurality of compounds such as nickel bis-[(3,5-di-t-butyl-4-hydroxybenzyl)-benzenephosphinate]; nickel bis(o-butyl-3,5-di-t-butyl-4-hydroxybenzyl-phosphonate); nickel bis(3,5-di-t-butyl-4-hydroxybenzoate); nickel n-octylthioacetate; [2,2'-thiobis(4-t-octylpenolato)]n-butylamine nickel and the like. None of these compounds is disclosed as having any activity as a vulcanization accelerator.

Finally, U.K. Pat. No. 914,787 discloses the use of cobalt-mercaptobenzothiazole complexes in natural and synthetic rubbers as both an accelerator and to permit the rubber to be glued or bonded directly to ferrous metal during vulcanization. The exemplary rubber stocks reported in the patent also contain pine tar, which is added to increase the strength of the adherence of rubber to the metal. The patent also states that the effect of the cobalt complex to promote adhesion is improved by adding lead dioxide.

While others have sought to enhance adhesion between rubber compositions and metals by employing various combinations of cobalt and other metal salts with resins, the art of which has been presented herein has not disclosed the exclusive use of an accelerator comprising an organic salt of nickel with mercaptobenzothiazole to increase adhesion properties between rubber and brass-plated metallic reinforcement.

DISCLOSURE OF INVENTION

The present invention provides a vulcanizable rubber composition having improved metal adhesion and metal adhesion retention properties when cured, i.e., vulcanized, by incorporating prior to curing from about 0.5 to about 10.0 parts by weight of bis(2-mercaptobenzothiazato) nickel per 100 parts of the rubber component in the rubber composition.

The present invention further provides a metal-reinforced rubber ply to be used as a component in the construction of a manufactured rubber article such as a tire, the ply having a rubber composition and a steel element bonded thereto wherein the rubber composition comprises from about 0.5 to about 10.0 parts by weight of a bis(2-mercaptobenzothiazato) nickel per 100 parts of the rubber component of the rubber composition.

In the manufacture of rubber articles such as tires, several structural components are employed. Some of the structural rubber components found in a typical tire, often as one or more layers, include a tread ply skim, body ply skim, bead filler, innerliner, sidewall, stabilizer ply insert, toe filler, chafer, undertread, tread, and the like. Many of these rubber ply components can be reinforced with steel wire or cable and it is important that the bond between the rubber and the reinforcing filaments be strong.

Still further, the present invention provides a method of improving metal adhesion and metal adhesion retention properties when cured including the step of dispersing from about 0.5 to about 10.0 parts by weight of bis(2-mercaptobenzothiazato) nickel per 100 parts of the rubber component in the rubber composition prior to curing. Metals to which the vulcanizable rubber composition can be adhered by practice of the present invention include brass, zinc and brass-plated and zinc-plated steel cord.

PREFERRED MODE FOR CARRYING OUT THE INVENTION

To illustrate the invention, a typical example of a rubber composition with metallic reinforcement embedded therein was chosen. In particular, the examples used to demonstrate the invention included a natural and a synthetic rubber skim stock, which stocks are suitable for the preparation of rubber articles such as tires. Adhesion between these stocks with brass-plated and zinc-plated steel reinforcement subsequent to vulcanization was measured and has also been presented hereinbelow.

The polymer portion of the rubber composition used in the following examples comprises 100 parts by weight of natural rubber or 100 parts by weight of synthetic polyisoprene. Polymer type, here, is not deemed to be a limitation to the practice of the instant invention. Natural rubber may also be employed in a blended state with one or more synthetic rubbers such as styrene-butadiene, synthetic isoprene, polybutadiene, or other synthetic rubbers with a natural rubber content of at least 40 to 50 percent. Further, pure forms of synthetic rubbers such as those disclosed may be used either alone or blended with other synthetic rubbers. Generally, EPDM rubbers should not be employed inasmuch as the diene unsaturation is too low.

The ingredient utilized in the practice of the present invention comprises an organic salt of nickel formed with mercaptobenzothiazole. The amount employed ranges from about 0.5 to about 10.0 parts by weight based upon the weight of 100 parts of rubber (phr).

Bis(2-mercaptobenzothiazato) nickel or Ni(MBT)$_2$, employed to demonstrate the present invention was prepared as follows. A suspension of nickel hydroxide (46.5 g, 0.5 mole) and 2-mercaptobenzothiazole (167 g, 1.0 mole) in 1500 ml of distilled water was stirred at 80° C. for 120 minutes. After the reaction was completed, the reaction mixture was collected on a filtration disc and washed with 500 ml of hot distilled water to remove the unreacted material. The insoluble Ni(MBT)$_2$.xH$_2$O obtained was dried with care at 100° to 120° C. under vacuum to remove substantially all the water of hydration but without calcining the salt. The anhydrous Ni(MBT)$_2$ was obtained as a deep green powder. Yield was 186 g or 95% conversion. The calculated amount of nickel present was 15.1 percent, analysis conducted on the salt indicated that 14.7 percent was actually present.

In order to determine the improvement in adhesion obtained when the nickel salt accelerator was added to the rubber skim stock, T-adhesion tests (rubber-steel cord) were conducted.

The test utilized T-adhesion pads prepared by placing 60 gauge sheets of uncured fully compounded rubber skim stock on 51 gauge fabric reinforced rubber backing. Commercial brass-coated wires (1×5×0.25 mm diam.) were placed between two pads of the reinforced skim stock with the wires in contact with the uncured rubber skim at 1.25 cm intervals. The width of each adhesion pad was 1.25 cm. The pads were placed in a preheated mold and were cured for 30 minutes at 149° C. Testing was done on a Model 1130 Instron Universal Tester at a crosshead speed of 25.4 cm per minute with samples preheated for 20 minutes at 110° C. prior to testing. Oven aging of the cured T-adhesion pads was done in a forced air oven at 121° C. for two days. Steam bomb aging of the cured samples was done in a pressure tight bomb for one hour at 149° C., in a saturated steam atmosphere.

DETAILED T-Adhesion Test Procedure

1. Using a Clicker machine and a 15.24×1.25 cm die, prepare an adequate number of calendered and control stock samples for T-adhesion pad building.
2. Use one piece of calendered fabric reinforced rubber backing (0.1295 cm).
3. Ply one piece of 60 gauge control rubber skim stock (0.1524 cm) onto the fabric backing.
4. Place sample in building jig with fabric side down.
5. Place ten cords (of brass or zinc coated wire) approximately 17.78 cm in length equally spaced on top of the two piece assembly.
6. Invert another 2 ply assembly, made as in items 1, 2 and 3, on top of cords so that cords are between the two layers of rubber skim stock to be tested.
7. This assembly should now fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.350 to obtain kilonewtons per meter.

In the tests which follow, a natural rubber skim stock, composition A, was prepared which did not contain the adhesion promoting ingredient of the present invention. Rubber compositions B–D were prepared exactly as was composition A except that they contained varying amounts of Ni(MBT)$_2$. A synthetic polyisoprene skim stock, composition E, was also prepared without Ni(MBT)$_2$ and was compared against compositions F and G which contain 2.4 and 3.5 phr of Ni(MBT)$_2$, respectively. Formulations for each stock are as follows with all parts given on the basis of parts per hundred rubber (phr) by weight.

| Compounding Ingredients | Composition A | Composition E |
|---|---|---|
| Natural Rubber (E grade) | 100 | — |
| Synthetic Polyisoprene | — | 100 |
| HAF Black | 50 | — |
| GPF Black | — | 65 |
| Zinc Oxide | 5.0 | 10 |
| Stearic Acid | 0.5 | 0.5 |
| Santoflex DD[1] | 2.0 | — |
| PBNA[2] | — | 1.0 |
| Aliphatic Hydrocarbon Resin | 2.0 | — |

-continued

| Compounding Ingredients | Composition A | Composition E |
|---|---|---|
| Process Oil | 2.0 | 6.0 |
| NOBS Special accelerator[3] | 0.6 | — |
| Santoflex 13[4] | 1.0 | — |
| Vulkacit DZ[5] | — | 1.0 |
| Sulfur MB[6] | 5.0 | 9.5 |
| Santogard PVI[7] | 0.4 | — |

[1]6-dodecyl-1,2-dihydro-2,2,4-trimethylquinoline
[2]N—phenyl beta-naphthylamine
[3]N—oxydiethylene-2-benzothiazole-sulfenamide
[4]N—(1,3-dimethylbutyl)-N'—phenyl-p-phenylenediamine
[5]N,N—dicyclohexyl-2-benzothiazole sulfenamide
[6]80/20 sulfur/extender oil preblend, with a naphthenic oil in the range of 18-22% oil. The sulfur is a yellow powder, 89.5 min. of which is insoluble sulfur.
[7]N—(cyclohexylthio)phthalimide It is to be understood that the foregoing compositions of rubber skim stocks have been presented solely to enable those skilled in the art to have at least one natural and one synthetic polyisoprene skim stock with which to practice the invention. As such, the present invention is not to be limited only to these specific formulations.

The six compositions were each used to build T-adhesion pads with brass-plated and zinc-plated steel cord. Three sets of tests were conducted on each of the six stocks for comparison. Table I shows the results of the testing under normal, oven aged and steam aged conditions. The force necessary to pull or remove the metallic reinforcement from the vulcanized rubber skim stock is given first, in KN/m, followed by the percent of rubber skim stock remaining on the surface of the metallic reinforcement. The amount of rubber skim stock remaining on the metallic reinforcement was determined by visual examination and has been reported as % rubber coverage.

TABLE I

Short Term Aged Steelcord T-Adhesion Tests

| Rubber Compositions | A | B | C | D | E | F | G |
|---|---|---|---|---|---|---|---|
| Ni(MBT)$_2$, phr | — | 1.08 | 2.15 | 3.20 | — | 2.4 | 3.5 |
| Test A | | | | | | | |
| Normal (Unaged)[a] | | | | | | | |
| Brass-plated cord | | | | | | | |
| KN/m | 24.05 | 25.73 | 28.53 | 24.85 | 27.48 | 20.44 | 16.8 |
| % rubber coverage | 90 | 85 | 95 | 95 | 95 | 80 | 80 |
| Zinc-plated cord | | | | | | | |
| KN/m | 3.68 | 2.98 | 13.65 | 19.6 | 1.05 | 17.5 | 17.85 |
| % rubber coverage | 0 | 0 | 40 | 80 | 0 | 70 | 70 |
| Test B | | | | | | | |
| Oven Aged[b] | | | | | | | |
| Brass-plated cord | | | | | | | |
| KN/m | 17.82 | 15.05 | 19.78 | 17.85 | 20.13 | 13.3 | 14.18 |
| % rubber coverage | 85 | 85 | 90 | 80 | 90 | 80 | 80 |
| Zinc-plated cord | | | | | | | |
| KN/m | 2.21 | 2.80 | 8.40 | 13.65 | 0.96 | 10.33 | 12.6 |
| % rubber coverage | 0 | 0 | 10 | 50 | 0 | 40 | 50 |
| Test C | | | | | | | |
| Steam Bomb Aged[c] | | | | | | | |
| Brass-plated cord | | | | | | | |
| KN/m | 26.32 | 24.50 | 25.03 | 19.6 | 12.95 | 17.85 | 17.50 |
| % rubber coverage | 90 | 90 | 90 | 65 | 55 | 80 | 85 |
| Zinc-plated cord | | | | | | | |
| KN/m | 2.73 | 3.15 | 12.60 | 17.15 | 1.05 | 15.93 | 15.93 |
| % rubber coverage | 0 | 0 | 25 | 70 | 0 | 80 | 85 |

[a]T-adhesion pads cured 30 minutes at 149° C. and tested at 110° C.
[b]T-adhesion pads cured 30 minutes at 149° C., heat aged in forced air oven for 2 days at 121° C. and tested at 110° C.
[c]T-adhesion pads cured 30 minutes at 149° C., aged in a pressure tight bomb for 1 hour at 149° C. in a saturated steam atmosphere and tested at 110° C.

As can be determined from Table I, Test A, adhesion of compositions B-D to brass plated and zinc-plated steel cord was significantly better than for composition A which contained no Ni(MBT)$_2$. Also, adhesion of the rubber skim stock to the metallic reinforcement increased with greater amounts of Ni(MBT)$_2$. Rubber compositions A, which contained none of the additive, showed lower adhesion values and 0 percent rubber coverage for zinc-plated steel wire. As can be seen from Test B, compositions B-D showed significantly greater adhesion for zinc-plated steel cord than the control and exhibited excellent coverage and, therefore, superior rubber to metal adhesion over composition A for compositions containing at least 2.15 phr of the additive.

Finally, the effect of steam bomb aging is presented in Test C. Again, a significant improvement in adhesion and rubber coverage to zinc-plated steel was observed for compositions B-D as compared with the control, composition A, while adhesion values to brass-plated steel cord were at least as good as the control.

By comparing compositions E, F and G, the effect of Ni(MBT)$_2$ in a synthetic polyisoprene stock can be seen for each of the three tests. Results were comparable in Tests A and B to brass-plated steel cord and significantly better to zinc-plated steel cord. In Test C, both brass-plated and zinc-plated steel cord adhesion values were vastly improved over the control, composition E.

The rubber coverage measurement is deemed to be significant in that it visually represents the increased adhesion of the rubber composition to the plated steel cord. As is well known to those skilled in the art, the amount of rubber adhering to the steel cord after it has been pulled from a cured T-adhesion pad represents the relationship of the adhesive force attaching the rubber composition to the surface of the steel cord and the tear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Normal or unaged testing is merely a measurement of the initial adhesion properties between the rubber composition and the metalic reinforcement. The oven aging test is an accelerated heat aging test and is significant in determining the effect of heat on the thermal stability of the chemical bonds formed between the rubber composition and the metallic reinforcement during vulcanization. Steam bomb aging for one hour at 149° C. is an accelerated humidity aging test and is significant in determining the chemical stability of the chemical bonds formed between the rubber skim stock and the metallic reinforcement when exposed to moisture or steam under pressure.

Based on the foregoing results reported in Table I, the presence of the nickel accelerator disclosed herein in a vulcanizable rubber skim stock have been shown to be effective in promoting adhesion between the rubber skim stock and metal. As stated hereinabove, the rubber can be natural or synthetic or a blend and formulated as a rubber stock or a skim stock. Also, the metal employed in the practice of the invention can be brass or zinc or brass-plated or zinc-plated steel wire in the form of a strand, mat, web, ply or braid.

The present invention also finds utility in, for example, other rubber articles bonded to brass or brass-plated steel such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied within the scope of the total specification disclosure by selection of various rubbers of the type set forth herein as well as the amounts thereof, and of the nickel accelerator and it is believed that practice of the present invention can be determined without departing from the spirit of the invention herein disclosed and described, the scope of the invention being limited solely by the scope of the attached claims.

We claim:

1. A metal-reinforced rubber ply to be used as an element in a manufactured rubber article, said ply having a rubber composition and a plated steel element bonded thereto wherein said rubber composition is made by curing a composition comprising:

a vulcanizable rubber; and from about 0.5 to about 10.0 parts by weight of a bis(2-mercaptobenzothiazato) nickel per 100 parts of the rubber component in said rubber composition as a promoter of adhesion between said rubber and said plated steel element.

2. A metal-reinforced rubber ply, as set forth in claim 1, wherein the amount of bis(2-mercaptobenzothiazato) nickel employed is 3.20 parts per 100 parts of rubber.

3. A metal-reinforced rubber ply, as set forth in claim 1, wherein said rubber is selected from the group consisting of natural rubber, synthetic rubber and blends thereof.

4. A metal-reinforced rubber ply, as set forth in claim 1, wherein said plated steel element is selected from the group consisting of brass-plated steel and zinc-plated steel.

* * * * *